United States Patent [19]
Robelen

[11] 3,930,628
[45] Jan. 6, 1976

[54] DEPOLY/RELEASE SYSTEM

[75] Inventor: David B. Robelen, Newport News, Va.

[73] Assignee: The United States of America as represented by the National Aeronautics and Space Administration, Office of General Counsel-Code GP, Washington, D.C.

[22] Filed: Nov. 27, 1974

[21] Appl. No.: 527,727

[52] U.S. Cl. ............................................ 244/139;
[51] Int. Cl.² .................................... B64D 25/00
[58] Field of Search........ 244/138 R, 139, 141, 148, 244/149; 46/86 B, 243 AV, 244 B

[56] References Cited
UNITED STATES PATENTS

| | | | |
|---|---|---|---|
| 1,899,713 | 2/1933 | Nichols | 244/148 |
| 1,938,853 | 12/1933 | Miller | 244/139 |
| 2,118,603 | 5/1938 | Hailey | 244/139 |
| 2,257,277 | 9/1941 | Righter et al. | 244/139 |
| 2,478,758 | 8/1949 | Frieder et al. | 244/139 |
| 3,107,887 | 10/1963 | Dixon et al. | 244/139 |
| 3,301,511 | 1/1967 | Webb | 244/138 R |
| 3,463,425 | 8/1969 | Tatsusaburo | 244/139 |
| 3,699,708 | 10/1972 | Mabuchi | 46/243 AV |

FOREIGN PATENTS OR APPLICATIONS 2,045,966  3/1972  Germany ........................... 244/139

Primary Examiner—Trygve M. Blix
Assistant Examiner—Galen L. Barefoot
Attorney, Agent, or Firm—Howard J. Osborn; Wallace J. Nelson; John R. Manning

[57] ABSTRACT

An apparatus is disclosed for arresting uncontrollable motions of model aircraft. A signal is used to deploy a parachute when a model aircraft is in a motion, such as a tailspin, from which the operator cannot recover by manipulating the flight surfaces. After the model aircraft has been stabilized to a point where the operator can arrest the uncontrollable motion the parachute is jettisoned and normal flight resumed. The deploy and jettison signals may be sent using a single channel of a multi-channel transmitter and are completely independent of each other.

8 Claims, 3 Drawing Figures

DEPOLY/RELEASE SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to an apparatus for arresting uncontrollable motions in model aircraft by deploying a parachute to stabilize the aircraft, then jettisoning the parachute to resume normal flight.

2. Description of the Prior Art

The advantages of building and testing scale model aircraft are well known. Scale model tests provide data from which new designs can be verified, old designs can be improved and dangerous design defects can be discovered. In the course of testing, the models must often perform maneuvers where the risk of a crash are high. For example, in studying a particular design's ability to recover from a tailspin, the spinning motion may develop to a point where the operator cannot arrest the motion by manipulating the flight control surfaces. To avoid destruction of the model aircraft in these cases, it is necessary to provide the operator with a mechanism for regaining control of the aircraft.

While earlier developments include deploying a parachute to slow the aircraft and safely lower it to the ground, these earlier developments lacked the aspects of the present invention whereby the parachute can be jettisoned on command from the operator.

An application showing the use of a radio control system to deploy a parachute is described in U.S. Pat. No. 2,257,277 to Righter et al. However, the parachute described by Righter et al. remains attached to the aircraft and is used only to land the aircraft. The Righter et al. patent does not contemplate jettisoning the parachute. U.S. Pat. No. 3,497,168 to Finney et al. does teach jettisoning a parachute. In the Finney et al. teaching, a first parachute is deployed and after a predetermined interval the parachute is jettisoned. A second parachute is then deployed and the object safely lowered to the ground. Once the sequence described in the Finney et al. patent is initiated, however, the operator has no control over when the first parachute will be jettisoned. The present invention, on the other hand, gives the operator complete freedom as to when the parachute will be deployed and when it will be jettisoned without having to rely on a predetermined timing sequence.

Other prior art generally relating to the field of the invention includes U.S. Pat. No. 2,478,758 to Frieder et al., U.S. Pat. No. 3,451,642 to Wieland et al. and U.S. Pat. No. 3,463,425 to Hibi, all of which use a parachute to safely lower a load to the ground. None of these patents contemplates jettisoning the deployed parachute.

It is therefore an object of the present invention to disclose an apparatus for arresting uncontrollable motions of a model aircraft.

A further object of the present invention is an apparatus whereby a parachute may be deployed and jettisoned at the command of the operator.

An additional object of the present invention is an apparatus performing the deploy and jettison operations on command using the same channel of a radio control transmitter.

These and other advantages of the invention will be readily apparent when considered in reference to the description and claims and taken in connection with the attached drawings to which they relate.

SUMMARY OF THE INVENTION

In the present invention a platform is rigidly affixed to the tail end of a model aircraft by means of a frame. The platform and frame may be manufactured from any suitable lightweight materials such as plywood for the platform and aluminum tubing for the frame.

The parachute which is deployed to stabilize an uncontrollable aircraft is stored on the platform during normal flight operations and is held firmly in place by an elastic band which is tightly stretched over the folded parachute. The elastic band is firmly attached to one side of the platform and has a metal loop fastened to the free end. The free end is stretched over the folded parachute and the metal loop is received between two eyelets which are rigidly fastened to the platform. A release pin is slidably positioned through the two eyelets and the metal loop and holds the elastic band over the parachute.

The shrouds of the parachute are connected to a riser having a closed loop at one end. A plunger is slidably positioned through the closed loop and holds the deployed parachute until the parachute is jettisoned. Since the parachute induces a substantial load on the plunger the plunger is held in place by a spring. A number of ways for operating the deploy and jettison mechanisms will suggest themselves to one skilled in the art. In the preferred embodiment, it is intended that a radio control device be used to deploy and then jettison the parachute; however, any other suitable structure such as altitude or spin-sensitive device may be used to operate the deploy and jettison mechanism.

The use of a radio control system comprising a transmitter, receiver and proportional digital servo of the type generally known in the art, gives the operator complete control over the timing of the deploy and jettison operations. The operator can deploy the parachute after trying other means of arresting the uncontrollable motions; for example, by manipulating the flight surfaces. Additionally, since the deploy and jettison operations are not dependent upon a predetermined timing sequence the operator has complete freedom to determine when the aircraft motions have been arrested sufficiently to jettison the parachute.

Another advantage of using a radio control device is that both the deploy and jettison operations can be commanded using a single control channel. Thus, the addition of the present invention to a research model has a minimal effect on the availability of control channels to control other operations.

It will be readily seen from the following detailed description that the invention will permit an operator to arrest uncontrollable motions of a model aircraft by deploying a parachute. Further, it will be seen that the parachute may then be jettisoned and that the sequence of both the deploy and the jettison operation are completely controlled by the operator.

DESCRIPTION OF THE PREFERRED EMBODIMENT

Figure 1:
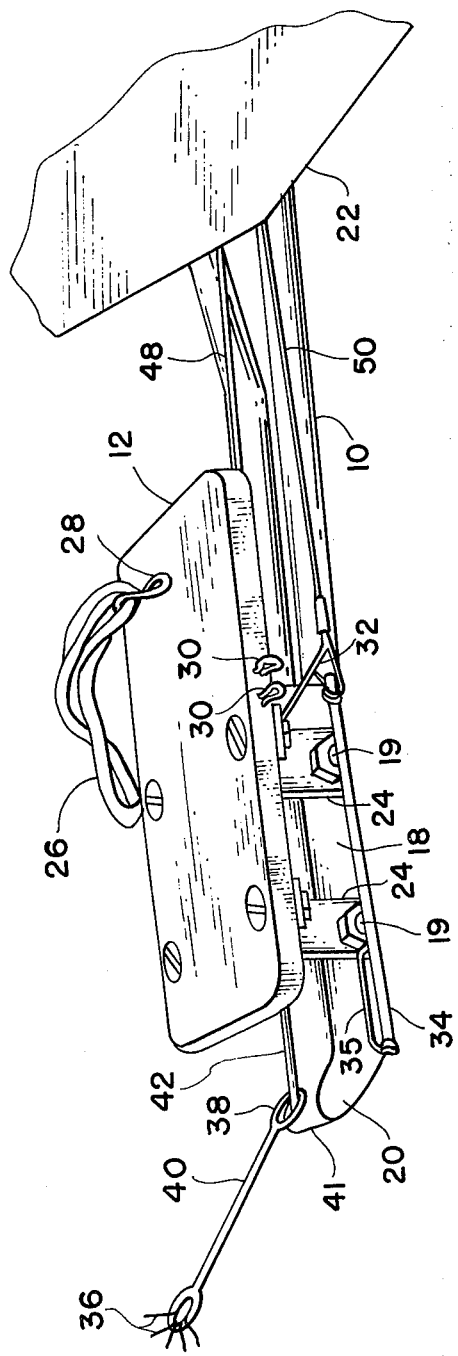
FIG. 1 is a perspective view of the present invention.
Figure 2:
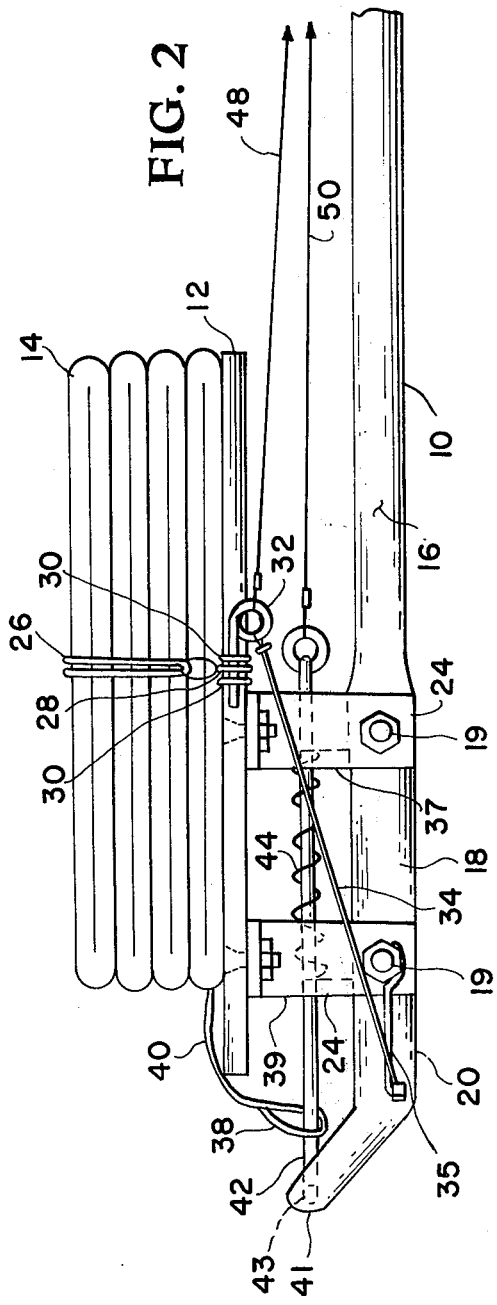
FIG. 2 is a side view of the present invention.

Referring now to the drawings, there is shown a preferred embodiment of the invention as it would be used to arrest uncontrollable tailspin motions. As best seen in FIG. 2, the apparatus comprises basically a frame 10, a platform 12, and a parachute 14.

Frame 10, in the preferred embodiment, is manufactured from aluminum but may be manufactured from any suitable material which is lightweight and has sufficient strength to resist the loads induced in the frame. Frame 10 comprises two tubes 16 each having a flattened portion 18 at one end which are rigidly attached to opposite sides of an elongated block 20. Although other techniques of securing tubes 16 to elongated block 20 will suggest themselves to one skilled in the art, in the preferred embodiment flattened portions 18 and elongated blocks 20 are fastened together by means of bolts 19. The other ends of tubes 16 are rigidly affixed in a conventional manner to the model aircraft 22. The tubes 16 may be shaped into any suitable configuration which will not interfere with normal operation of the flight surfaces.

Extending upward from flattened portions 18 are L-shaped brackets 24 to which platform 12 is fastened. In the preferred embodiment platform 12 is manufactured from a thin sheet of plywood but aluminum or any other suitable lightweight material may be used.

Parachute 14 is stored on platform 12 during normal flight operations and is held in place by an elastic band 26 having one end firmly fastened to the side of platform 12 while the free end is connected to a closed loop 28. The free end of elastic band 26 is stretched over stored parachute 14 and closed loop 28 is received between two eyelets 30 which are affixed to the side of platform 12. Elastic band 26 is held in this stretched position by a release pin 32 which is slidably positioned through eyelets 30 and closed loop 28. Release pin 32 is held in place by a resilient band 34 which is fastened at one end to release pin 32 and at the other to retaining clip 36 connected to frame 10.

Parachute 14 is stored on platform 12 during normal flight in a suitable folded position as is well known in the art. Parachute shrouds 36 are connected to a riser 40 having a closed loop 38 at one end which fits over a plunger 42. The plunger 42 in the preferred embodiment is manufactured from a bar of steel 0.0625 inch in diameter but other materials and dimensions may be used provided the loads induced in plunger 42 by parachute 14 can be safely accommodated. Plunger 42 and a rear support 39 is slidably positioned through a forward support 37 and one end thereof fits into a receptacle 43 in an upwardly extended portion 41 of elongated block 20. Plunger 42 is maintained in this position by a spring 44 having one end thereof attached to plunger 42 and the other end thereof attached to forward support 37.

The pin 32 is connected to a digital proportional servo 46 by means of a deploy cable 48 and in the same manner plunger 42 is connected to digital proportional servo 46 by means of a jettison cable 50. Deploy cable 48 and jettison cable 50, in the preferred embodiment, are standard 0.015 inch wire but any similarly thin gage material may be used. Digital proportional servo 46 is of any standard construction well known in the art.

OPERATION

Figure 3:
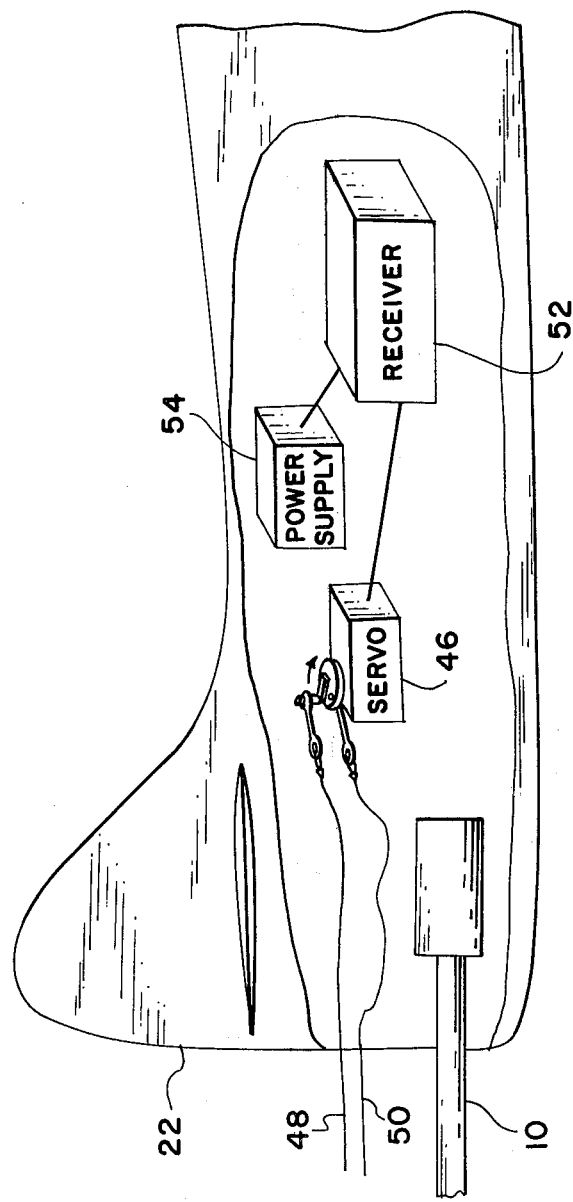
FIG. 3 shows a schematic arrangement of aircraft mounted components of the present invention.

In use, digital proportional servo 46 and associated power supply 54, receiver 52, and transmitter (not shown) are commanded to the armed position. Any standard radio control equipment of the kind widely known in the art may be used, but in the preferred embodiment Kraft Radio Control System's servo KP-12, receiver KPR-6, transmitter KPT-6, and power source KPB-500 are used. In the armed position, as shown in FIG. 3, deploy cable 48 which is connected to release pin 32 is slightly slack and jettison cable 50 which is connected to plunger 42 has sufficient slack to prevent jettisoning the parachute 14 when the servo is commanded to the deploy position. To deploy parachute 14 in the preferred embodiment the operator uses a transmitter of the kind widely known in the art to send a radio signal which is received on the model aircraft 22 by a standard receiver 52 also of the kind widely known in the art. Upon receipt of the deploy signal, digital proportional servo 46 rotates approximately 45°. This rotation tightens deploy cable 48 which in turn pulls pin 32 from eyelets 30 and closed loop 28 releasing elastic band 26. This rotation also removes the slack from the jettison cable and readies the apparatus for the jettison operation. The parachute 14 is no longer restrained and the airstream pulls parachute 14 from platform 12 and inflates it. Due to the complex consideration of the airflows around a spinning research model 22, each installation of this invention should be reviewed individually to assure that frame 10 is shaped and located in a manner which will facilitate deployment of the parachute.

When the operator desires to jettison parachute 14 he simply commands servo 46 to the jettison position which tightens jettison cable 50 causing plunger 42 to retract. As plunger 42 is pulled from receptacle 43 of upwardly extended portion of elongated block 41, closed loop 38 is pulled free by the drag load on parachute 14 and parachute 14 is thereby jettisoned.

It will be understood that the foregoing description is of the preferred embodiment of the invention and is therefore merely representative. Obviously, there are many variations and modifications of the present invention in the light of the above teachings. It is therefore to be understood that within the scope of the appended claims the invention may be practiced otherwise than as specifically described.

What is claimed as new and desired to be secured by Letters Pattent of the United States is:

1. Apparatus for arresting uncontrollable motions of a model aircraft comprising in combination:
    a model aircraft;
    a parachute having shrouds connected to one end of a riser; said riser having a closed loop at the other end thereof;
    a platform firmly attached to said model aircraft for supporting said parachute during normal aircraft flight; and parachute being releasably held in a suitably folded position on said platform by an elastic band having one end thereof securely fastened to said platform and having a metal loop at the other end thereof; said metal loop being releasably fastened to said platform by a release pin; a frame means for firmly attaching said platform to said aircraft; said frame means having a plunger slidably mounted thereon; said plunger being inserted through said loop of said riser for holding said parachute after said parachute has been deployed; a deploy means for releasing said release pin in response to a deploy signal thereby deploying said parachute; and jettison means for slidably moving said plunger in response to a jettison signal thereby jettisoning said parachute.

2. An apparatus as set forth in claim 1 wherein said stowing means includes:
   a platform for supporting said parachute during normal aircraft flight;
   said parachute being suitably folded and placed on said platform;
   an elastic band having one end thereof rigidly secured to said platform and the other end thereof secured to a metal loop;
   said elastic band being stretched over said parachute and said metal loop being releasably connected to said platform thereby securely holding said parachute against said platform during normal aircraft flight.

3. An apparatus as set forth in claim 2 wherein said deploy means includes two eyelets rigidly fastened to said platform; a release pin for holding said elastic band across said parachute; said elastic band being stretched over said parachute and said metal loop being received between said eyelets and releasably held therein by said release pin, said release pin being slidably positioned through said eyelets and said metal loop; said release pin being slidably removable from said eyelets and said metal loop in response to said deploy signal thereby releasing said elastic band and permitting said parachute to deploy.

4. An apparatus as set forth in claim 3 wherein said deploy means includes a tension means for applying a rearward acting tensile force to said release pin to thereby maintain said release pin positioned through said eyelets and said metal loop.

5. An apparatus as set forth in claim 1 wherein said jettison means includes a plunger slidably mounted on said frame means for holding said parachute after said parachute has been deployed; said plunger being inserted through said closed loop of said riser; and spring means for initially maintaining said plunger in position; said jettison signal serving to slidably move said plunger to thereby remove said plunger from said closed loop and cause jettisoning of said parachute.

6. An apparatus as set forth in claim 1 wherein said deploy means and said jettison means are operated by a linkage means in response to said deploy and jettison signals.

7. An apparatus as set forth in claim 1 wherein said deploy means and said jettison means are actuated by a linkage means comprising:
   a single radio channel; a radio receiver rigidly mounted in said aircraft for receiving said deploy and jettison signals; a single digital proportional servo rigidly mounted in said aircraft for releasing said release pin and for slidably moving said plunger; said digital proportional servo communicating with said deploy means by way of a deploy cable having one end thereof attached to said servo and the other end thereof attached to said release pin; said digital proportional servo also communicating with said jettison means by way of a jettison cable having one end thereof attached to said servo and the other end thereof attached to said plunger; and power source rigidly mounted in said aircraft for supplying power to said radio receiver and said digital proportional servo.

8. An apparatus as set forth in claim 7 wherein said receiver means receives remotely transmitted radio signals.

* * * * *

UNITED STATES PATENT OFFICE
CERTIFICATE OF CORRECTION

Patent No. 3,930,628            Dated January 6, 1976

Inventor(s) David B. Robelen

It is certified that error appears in the above-identified patent and that said Letters Patent are hereby corrected as shown below:

Columns 5 and 6, delete claims 2 through 6 and claim 8.

Signed and Sealed this twenty-second Day of June 1976

[SEAL]

Attest:

RUTH C. MASON
*Attesting Officer*

C. MARSHALL DANN
*Commissioner of Patents and Trademarks*